United States Patent Office.

ALONZO FARRAR, OF BROOKLINE, MASSACHUSETTS.

Letters Patent No. 100,877, dated March 15, 1870.

IMPROVED COMPOSITION, TO BE USED FOR PRINTING OR PAINTING ON SURFACES.

The Schedule referred to in these Letters Patent and making part of the same.

*To all persons to whom these presents may come:*

Be it known that I, ALONZO FARRAR, of Brookline, of the county of Norfolk, and State of Massachusetts, have invented a new and useful Composition to be used for Printing or Painting on Surfaces; and do hereby declare the same to be fully described as follows:

The first ingredient of the composition is the purified or deodorized oily residuum, resulting from the purification of sulphuric acid after having been used in the refining of petroleum.

On October 26, 1869, Letters Patent No. 96,097, were granted to me for a process of utilizing the said residuum, or depriving it of its offensive odor, and otherwise benefiting it, the product or oily results of the process being claimed in such patent as a new manufacture. It is this product or manufacture which enters into the present composition as its first ingredient, and it is the combination of it with certain pigments or matters, as hereinbefore set forth, or their equivalents, that constitutes my present invention.

In carrying out such invention, with one hundred pounds of the aforesaid oily product I mix twenty-eight pounds of lamp-black, four pounds of Prussian blue, eight pounds of Indian red, and nine pounds of molasses or a saccharine sirup.

The whole, when thorougly combined or mixed together, forms a compound of great value in the arts, as it may be used to cover surfaces, and may be printed or painted thereon, and will soon dry and impart to the surface covered by it a fine and smooth color.

I do not confine my composition to the precise proportions of its ingredients as hereinbefore named, as they may be more or less varied, and still be productive of good results.

I therefore claim—

The composition, as hereinbefore set forth, in which the new oily product, as mentioned, constitutes an important and valuable constituent.

Also, the combination of such product with one or more pigments, or with such and a saccharine sirup, as described

ALONZO FARRAR.

Witnesses:
 R. H. EDDY,
 J. R. SNOW.